(12) United States Patent
Halliwell

(10) Patent No.: US 11,742,794 B2
(45) Date of Patent: Aug. 29, 2023

(54) FRAME WITH PLENUM FOR SUPPORTING A PHOTOVOLTAIC ARRAY

(71) Applicant: HC Properties Inc, Clinton (CA)

(72) Inventor: John Martin Halliwell, Clinton (CA)

(73) Assignee: HC Properties Inc, Goderich (CA)

( * ) Notice: Subject to any disclaimer, the term of this patent is extended or adjusted under 35 U.S.C. 154(b) by 0 days.

(21) Appl. No.: 17/728,589

(22) Filed: Apr. 25, 2022

(65) Prior Publication Data
US 2022/0345082 A1  Oct. 27, 2022

(30) Foreign Application Priority Data
Apr. 23, 2021  (CA) ...................................... 3116049

(51) Int. Cl.
*H02S 40/40* (2014.01)
*H02S 20/23* (2014.01)
*H02S 30/10* (2014.01)

(52) U.S. Cl.
CPC ............. *H02S 40/40* (2014.12); *H02S 20/23* (2014.12); *H02S 30/10* (2014.12)

(58) Field of Classification Search
CPC ....... H01L 31/00–078; Y02E 10/50–60; H02S 20/00–32; H02S 30/00–20; H02S 40/10–12
USPC .................................................. 136/243–265
See application file for complete search history.

(56) References Cited

U.S. PATENT DOCUMENTS

| 2010/0224234 A1* | 9/2010 | Fischer ................. F28F 21/065 29/428 |
| 2017/0328602 A1* | 11/2017 | Miyamoto .............. F24S 25/35 |
| 2020/0144442 A1* | 5/2020 | Babajanyan .............. E04C 2/34 |

FOREIGN PATENT DOCUMENTS

| DE | 202011101517 | * | 7/2011 |
| JP | 2013231340 | * | 11/2013 |

OTHER PUBLICATIONS

JP2013231340 English (Year: 2013).*
DE202011101517 English (Year: 2011).*

* cited by examiner

*Primary Examiner* — Bach T Dinh
(74) *Attorney, Agent, or Firm* — Teitelbaum & Bouevitch; Neil Teitelbaum

(57) ABSTRACT

A frame for supporting a photovoltaic module (PV) includes a plurality of sidewalls, which are arranged to support the PV module at a spaced distance from an installation surface. The sidewalls define an interior volume having an open top and open bottom. One sidewall has a plurality of openings defined therethrough along a portion of a length thereof. A plenum is disposed adjacent to an exterior surface of the first sidewall and extends along at least the portion of the length of the first sidewall having the plurality of openings defined therethrough. The plenum has an inlet port for receiving a flow of warmed air from a source of warmed air, and is configured to distribute the flow of warmed air through at least some of the plurality of openings in the first sidewall and into the interior volume.

18 Claims, 4 Drawing Sheets

FRAME WITH PLENUM FOR SUPPORTING A PHOTOVOLTAIC ARRAY

CROSS REFERENCE TO RELATED APPLICATIONS

This application claims priority from Canadian Patent Application No. 3,116,049 filed Apr. 23, 2022 and incorporated herein by reference in their entirety.

FIELD

The present invention relates to a frame for use in installing a photovoltaic module or an array of such modules on the roof of a building, and in particular to a frame having a plenum for directing a flow of warmed air under the photovoltaic module or array.

BACKGROUND

A "photovoltaic module" or "photovoltaic panel" refers to a packaged and interconnected assembly of photovoltaic (PV) cells. An installation of PV modules or panels is known as a photovoltaic array. PV cells typically require protection from the environment. For reasons of cost and practicality, a number of cells are typically connected together electrically and packaged in a photovoltaic panel, which typically includes a frame that is formed from aluminum or other weather-resistant materials and covered with glass. The glass cover allows transmission of light therethrough but at the same time protects the PV cells from the elements and physical damage.

Photovoltaic modules or arrays are commonly installed on the roofs of houses or office buildings, which permits widespread deployment of solar power systems even in densely populated cities or areas that have limited available ground space. Various mounting systems are known for securing PV modules or arrays to sloped or flat roofs. For instance, a series of rails may be secured to a roof using fasteners and the PV modules may be clipped directly to the rails. Alternatively, several PV modules may be arranged to form an array within a frame, which is then installed as an assembled unit. A different approach uses raised frames with triangular-shaped supports to angle the PV modules toward the sun.

A problem that is commonly encountered in cold climates is that snow, sleet, ice etc. tend to collect and build up on the glass covers of the PV modules. Snow, in particular, severely reduces the intensity of sunlight being received by the PV cells, thus making solar panel power generation inefficient during winters and in cold climates.

The need thus exists for an improved system for installing photovoltaic modules and arrays that addresses the above-mentioned drawbacks.

SUMMARY

In accordance with an aspect of at least one embodiment there is provided a frame for supporting at least one photovoltaic module, comprising: a plurality of sidewalls arranged to support the at least one photovoltaic module at a spaced distance from an installation surface, the sidewalls defining an interior volume having an open top and an open bottom, wherein a first sidewall of the plurality of sidewalls has a plurality of openings defined therethrough along a portion of a length thereof; and a plenum disposed adjacent the first sidewall and extending along at least the portion of the length of the first sidewall having the plurality of openings defined therethrough, the plenum having an inlet port for receiving a flow of warmed air from a source of warmed air, and the plenum configured to distribute the flow of warmed air through at least some of the plurality of openings in the first sidewall and into the interior volume.

In accordance with an aspect of at least one embodiment there is provided a kit for supporting at least one photovoltaic module on a roof of a building, comprising: a frame comprising a plurality of sidewalls defining an interior volume that is covered by the at least one photovoltaic module when in a supported condition, one of the sidewalls having a plurality of openings defined therethrough, and the frame having a plenum defined adjacent to an exterior surface of the first sidewall and covering the plurality of openings, the plenum having an inlet port for receiving a flow of warmed air; a heater element; and a fan for directing into the plenum a flow of air that has been warmed by the heater element In accordance with an aspect of at least one embodiment there is provided a method comprising: providing at least one photovoltaic module supported by a frame comprising a plurality of sidewalls, a first one of the sidewalls having a plurality of openings defined therethrough, and a plenum is disposed adjacent to the first sidewall and extends around the plurality of openings; introducing a flow of warmed air into the plenum via an inlet port thereof such that the plenum distributes the flow of warmed air through at least some of the plurality of openings and into a space that is below the at least one photovoltaic module and is bounded by the plurality of sidewalls; and after heat transferred to the at least one photovoltaic module from the warmed air in the space has caused accumulated snow or ice on the photovoltaic module to melt, stopping the flow of warmed air into the plenum.

BRIEF DESCRIPTION OF THE DRAWINGS

The instant disclosure will now be described by way of example only, and with reference to the attached drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

As used herein, the term "photovoltaic module" is defined as an assembly of PV cells mounted in a framework for installation. The terms "photovoltaic panel" and "solar panel" may be used interchangeably with the term "photovoltaic module."

As used herein, the "photovoltaic array" is defined as a linked collection of PV modules. The PV modules may be pre-assembled into a frame such that the array is installed as a unit, or the PV modules may be installed individually on-site to form the PV array.

As used herein, the term "warmed air" refers to air or another gas that has been heated to a temperature higher than the ambient air temperature around the installed PV modules. If the ambient air temperature around the installed PV modules is less than 32° F. (0° C.), then the warmed air is heated to a temperature that is higher than 32° F. (0° C.).

Figure 1:
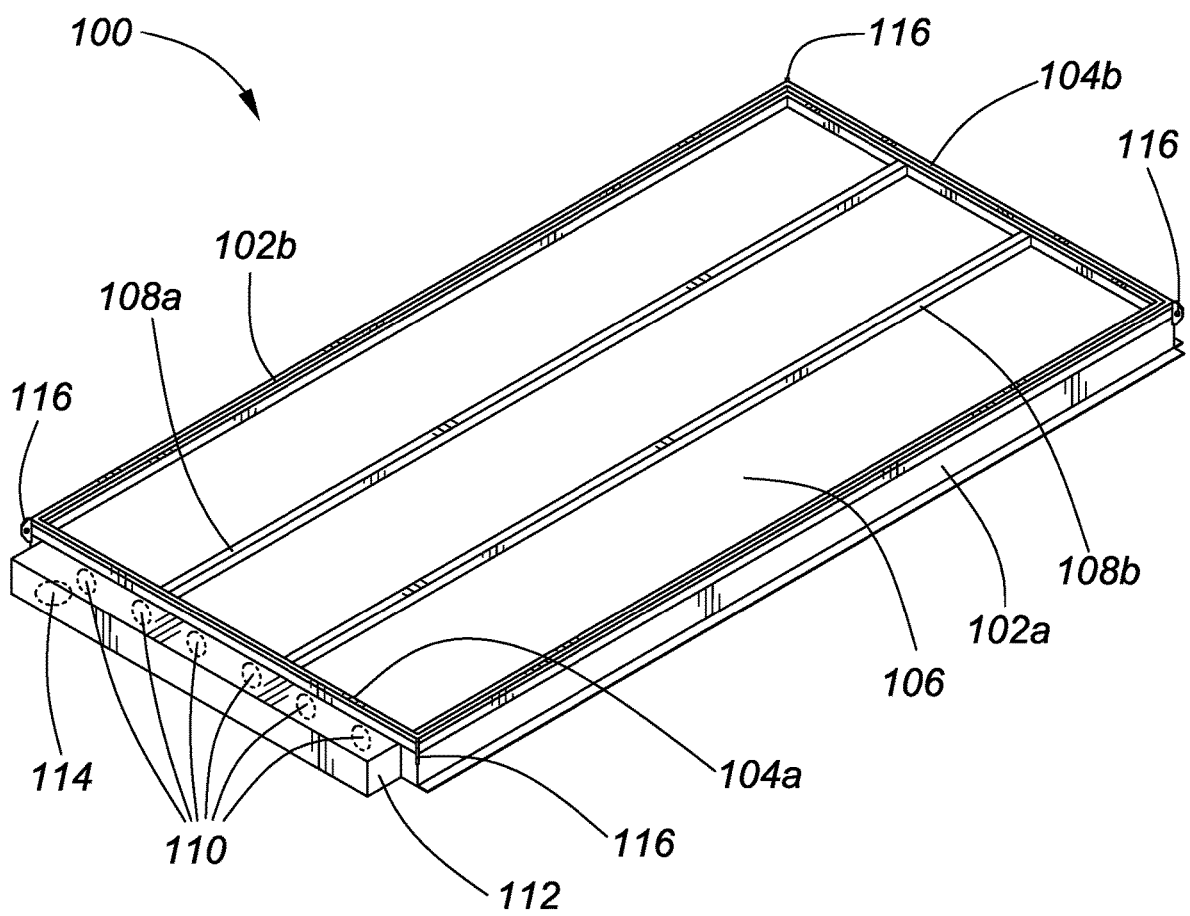
FIG. 1 is a perspective view of a frame according to an embodiment.

Referring now to FIG. 1, shown is a perspective view of a frame 100 for supporting a photovoltaic array (not illustrated in FIG. 1), according to an embodiment. The frame 100 includes a pair of opposed first sidewalls 102a and 102b and a pair of opposed second sidewalls 104a and 104b, which cooperate to define an interior volume 106 having an open top and an open bottom. Longitudinal support members 108a and 108b extend along a length of the frame 100, through the interior volume 106, between the opposed first sidewalls 104a and 104b. Each of the longitudinal supports 108a and 108b has an upper support surface that is vertically aligned with an upper support surface of the sidewalls 102a, 102b, 104a and 104b.

Referring still to FIG. 1, a plurality of openings 110 are defined along a portion of the length of one of the first sidewalls 104a, for instance between about 90% and 95% of a total length of the first sidewall. Of course, the openings may alternatively be defined along a different portion of the length of the sidewall 104a and/or may be spaced uniformly or non-uniformly from one another depending on specific design requirements or other factors. Alternatively, the plurality of openings 110 may be provided along a portion of the length of another one of the sidewalls 102a, 102b or 104b. The openings 110 provide fluid communication between the interior volume 106 and a plenum 112 that is disposed adjacent to an exterior surface of the sidewall 104a that is opposite the interior volume 106. The plenum 112 encloses the plurality of openings 110 and includes an inlet port 114 for receiving a flow of warmed air from a warmed air source (not illustrated in FIG. 1).

To facilitate mounting the frame 100 on the roof of a building, suitable attachment structures such as for instance welded attachment flanges 116 are provided i.e., at each of the four corners of the frame 100 between adjacent sidewalls 104a and 102a, 102a and 104b, 104b and 102b, and 102b and 104a. During mounting on the roof of the building, cables attached to a crane or other suitable equipment may be connected to the welded attachment flanges 116 and used to lift the frame 100 onto the roof.

Figure 2:
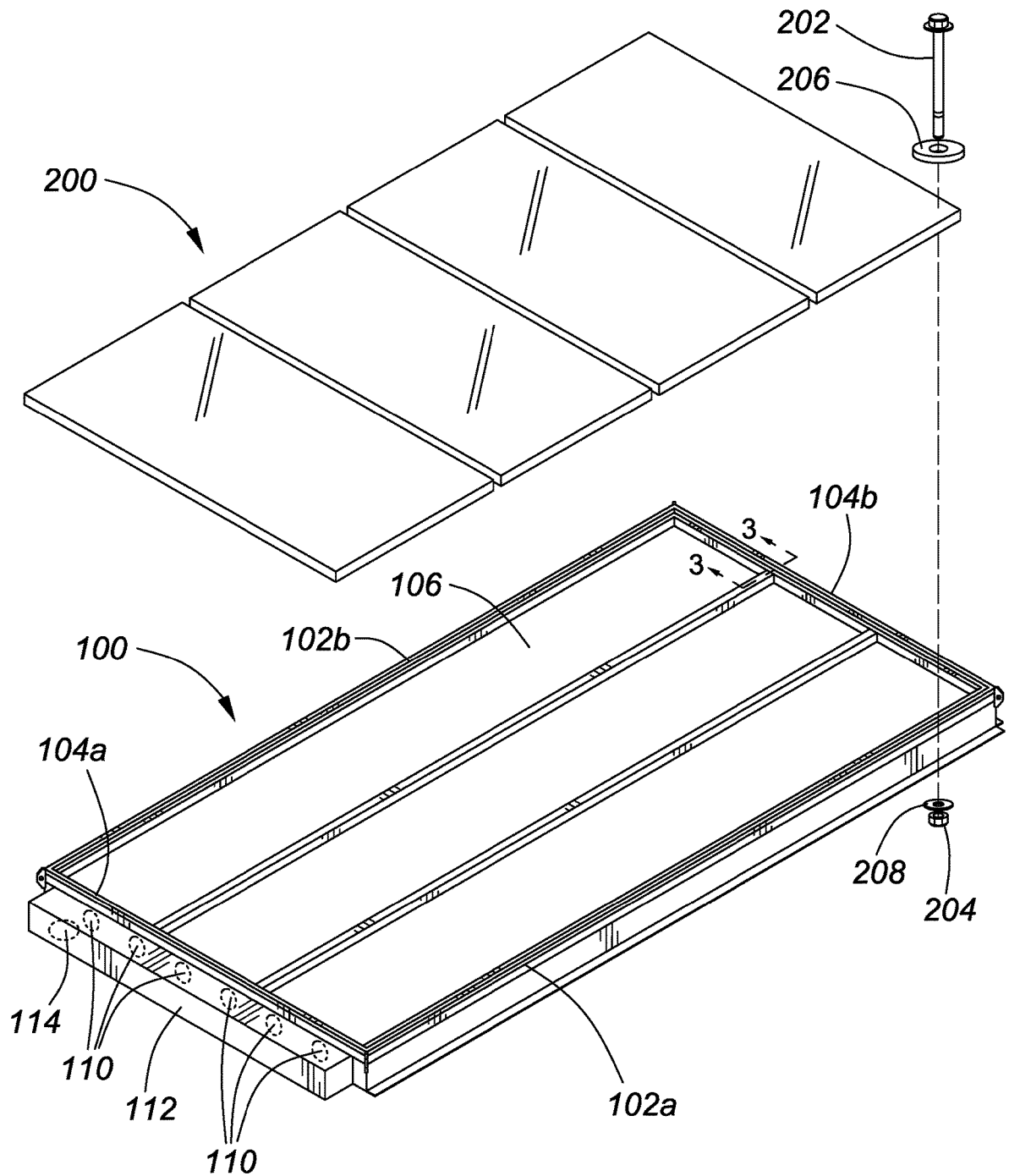
FIG. 2 is an exploded view showing a plurality of photovoltaic modules, which collectively form a photovoltaic array, adjacent to the frame of FIG. 1.

FIG. 2 is an exploded view showing photovoltaic modules forming a photovoltaic array 200, which is supported on the upper support surfaces of the frame sidewalls 102a, 102b, 104a and 104b and on the upper support surfaces of the longitudinal supports 108a and 108b. The photovoltaic array 200 is retained in place using suitable mechanical fasteners, such as bolt 202, nut 204 and washers 206 and 208, along the perimeter sidewalls 104a and 104b. As is shown most clearly in FIG. 3, which is a cross sectional view taken along the line 3-3 in FIG. 2, the sidewall 104b may be formed as a plurality of separate profiles that are joined together, such as for instance by welding. In this specific example, sidewall 104b includes a first square tube 300, a second square tube 302, and a skirt 304 having an outwardly extending lower flange 312. By way of a specific and non-limiting example, the first square tube 300 is a 1 inch by 1 inch aluminum square tube with a 0.125 inch wall thickness, the second square tube 302 is a 2 inch by 2 inch aluminum square tube with a 0.125 inch wall thickness, and the flanged skirt 304 has a height of approximately 5.5 inches to 6 inches with a flange formed at the base thereof and extending outwardly approximately 1 inch to 1.5 inches. The other sidewalls 102a, 102b and 104a may have a similar structure. Alternatively, the sidewalls 102a, 102b, 104a and 104b may be formed such as for instance as extruded profiles or by using another suitable technique.

Figure 3:
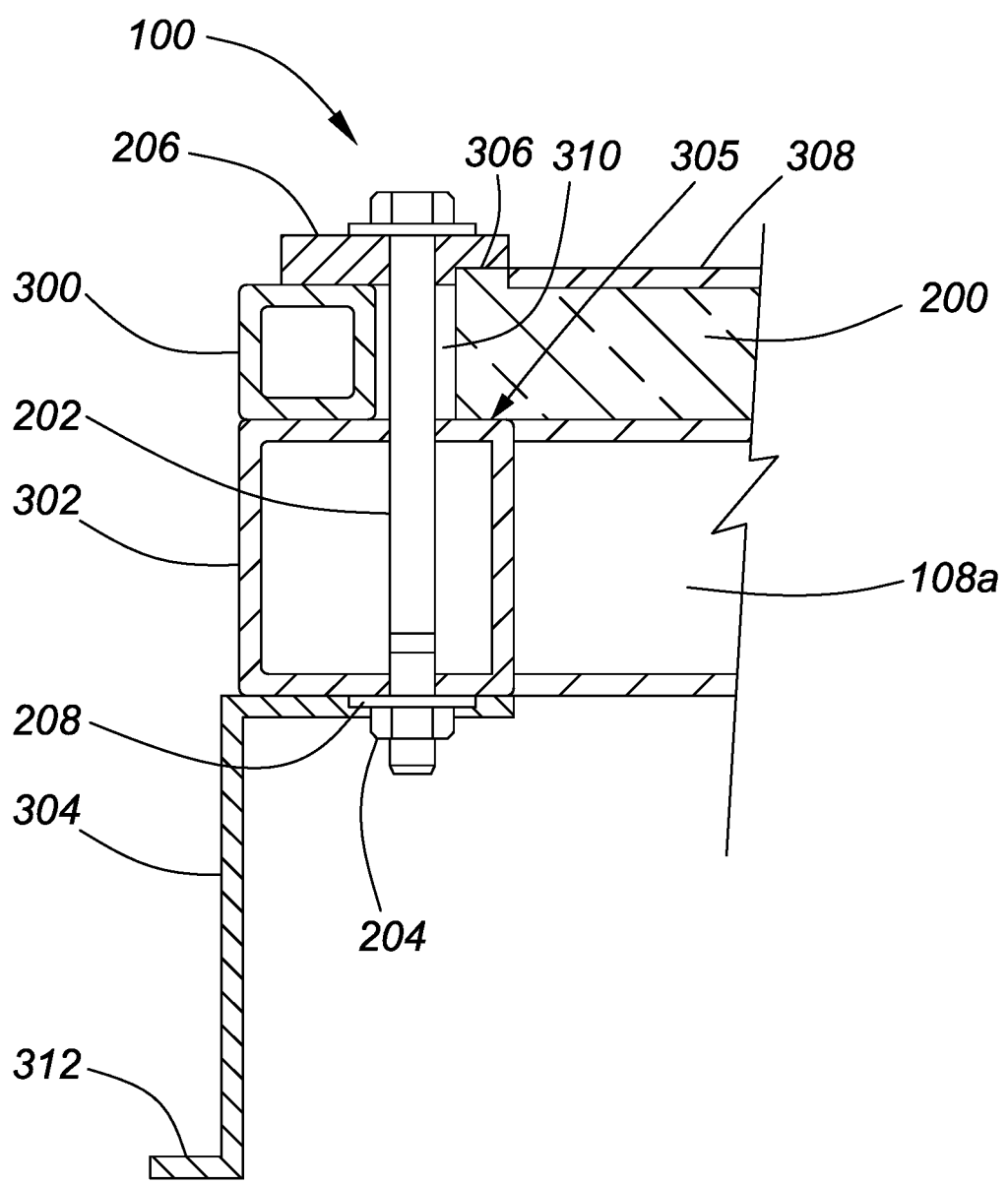
FIG. 3 is a cross sectional view taken along line 3-3 in FIG. 1, with a photovoltaic module secured to the frame.

Referring still to FIG. 3, the upper support surface 305 of sidewall 104b is defined by a portion of the second square tube 302 that is disposed inwardly of the first square tube 300. The upper support surface 305 is recessed below the top of the first square tube 300, such that the first square tube 300 forms a raised edge that extends around the periphery the PV array 200 and prevents movement of the individual PV modules. The first square tube 300 also acts as a vertical spacer element for supporting the washer 206, which is preferably has a notch 306 formed on one side thereof. The notch 306 simultaneously engages the top and the side-edge of the PV modules of the PV array 200. The washer 206 does not directly press on the glass cover 308 of the PV modules. Advantageously, the notch 306 spaces the side-edge of PV module away from the bolt 202 so as to form a gap 310 therebetween. The bolt 202 extends through the washer 206, through the gap 310, through the second square tube 302 and through a portion of the flanged skirt 304 that is disposed below the second square tube 302. The washer 208, which is a flat washer, and the nut 204 are secured on the threaded end of bolt 202 in known fashion.

Mechanical fasteners are used along the sidewalls 104a and 104b, and additional mechanical fasteners are used between adjacent PV modules to fasten the PV array 200 to the longitudinal supports 108a and 108b. However, it is not necessary to use mechanical fasteners along the sidewalls 102a and 102b since the edges of the PV modules are butted up against first square tube 300, which prevents the PV modules from sliding out of the frame 100.

Figure 4:
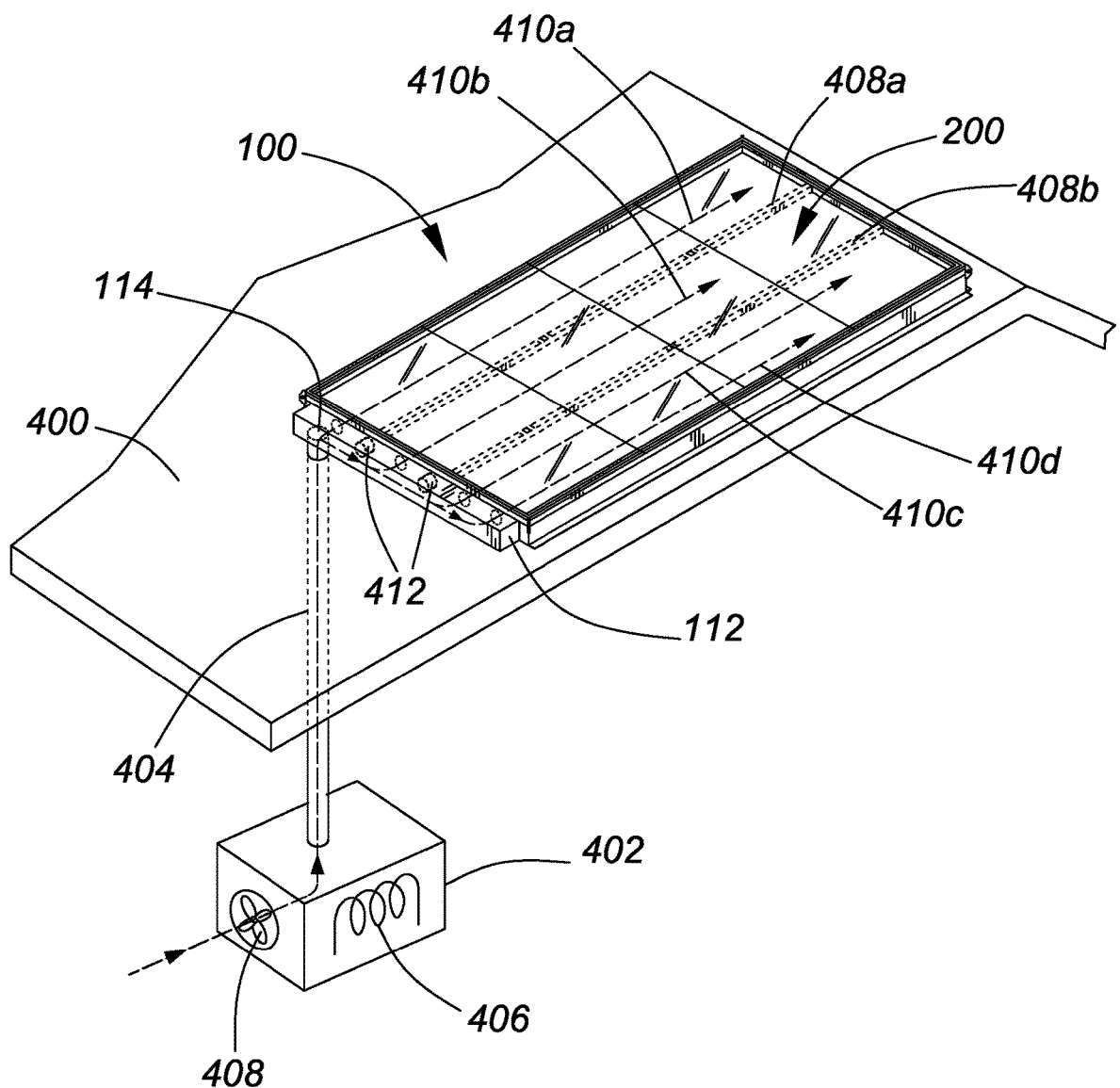
FIG. 4 shows the frame of FIG. 1 installed on a roof of a building and with the plenum in fluid communication with a source of warm air.

Referring now to FIG. 4, shown is the frame 100 of FIG. 1 and FIG. 2 in an installed condition on a roof 400 of a building. The photovoltaic array 200 is not shown in FIG. 4 so as to more clearly illustrate the principle of operation, including a representation of the directional flow of warmed air that is introduced into the interior volume 106 via the plenum 112. However, it is to be understood that during use the PV array 200 of PV modules is installed on the frame 100 and acts as a cover that at least partially retains warmed air within the interior volume 106.

As shown in FIG. 4, the frame 100 is preferably installed on roof 400 without the use of rails or other mounting structures. For instance, if roof 400 is a metal roof with a corrugated structure the frame 100 may be installed such that the lower flange 312 at the base of skirt 304 sits on the raised corrugations, thereby creating natural drainage channels below the frame 100. The inlet port 114 of the plenum 112 is in fluid communication with a source of warmed air 402 via conduit 404. In the example that is shown in FIG. 4, the source of warmed air 402 is disposed within the interior of the building and conduit 404 passes through the roof to the inlet port. The source of warmed air 402 may include an electrical heating element 406 to increase the temperature of the air. The electrical heating element may be powered by a battery bank that is charged by the PV array 200. Alternatively, the source of warmed air 402 may include a gas burner or a circulating heat exchange medium. The source of warmed air 402 additionally includes a blower 408 for directing the warmed air through the conduit 404 and into the plenum 112, as indicated by the dashed line in FIG. 4. Alternatively, if the source of warmed air 402 is disposed within a space-heated portion of the building then it may include only the blower 408 for directing the warmed building air through the conduit 404 and into the plenum 112, without additional heating.

The plenum 112 distributes the flow of warmed air through the openings 110 in the sidewall 104a of frame 100 to create a predetermined flow pattern of warmed air in the interior volume 106, as indicated by the dashed lines 410a-d in FIG. 4. The not illustrated photovoltaic array 200 acts as a cover to substantially retain the warmed air within the interior volume 106. The warmed air that is trapped within the interior volume 106 increases the temperature of the underside of the PV modules, and the heat transferred from the warmed air is conducted through the PV modules and melts the snow or ice accumulated on the upper sides thereof. In addition, some of the warmed air passes out through the open bottom of the interior volume 106 and melts snow and ice surrounding the frame 100, thereby at least partially clearing snow and ice buildup around the frame 100.

Flow balancing plugs 412 may be disposed within some of the openings 110 in the sidewall 104a, as shown in FIG. 4, for controlling the flow pattern of warmed air in the interior volume 106. For instance, the balancing plugs 412 block the flow of warmed air through selected ones of the openings 110. Depending on various factors, such as PV module slope, wind-blocking features on the roof, etc., it may be desirable to distribute more of the flow of warmed air within portions of the interior volume 106 that are beneath areas of high snow and ice buildup and to block the flow of warmed air within portions of the interior volume 106 beneath areas of low snow and ice buildup.

Optionally, the 100 frame includes a not illustrated cover across the bottom of the interior volume 106, which prevents the warmed air from escaping and melting the snow around the frame 100. Such a configuration may be desirable to prevent excessive loss of the warmed air e.g., if the frame is mounted more than several centimeters above the roof surface. Of course, suitable drainage openings should be provided to allow water to drain out of the interior volume 106

As will be apparent, snow and/or ice buildup on PV modules occurs under only certain conditions, such as for instance during cold weather typically experienced during winter months. Even during periods of cold weather, precipitation in the form of snow and/or freezing rain etc. occurs only occasionally and therefore snow and/or ice buildup on the PV modules does not occur continuously. Advantageously, the source of warmed air 402 may be used on demand e.g., when conditions necessitate the removal of snow and/or ice buildup on the PV modules. Various methods of manually or automatically controlling the source of warmed air 402 may be envisaged. For instance, the source of warmed air 402 may be activated by a user when visible snow and/or ice buildup is observed and then terminated by the user when no visible snow and/or ice buildup remains on the PV modules. Alternatively, the source of warmed air 402 may shut off automatically after a predetermined or user selected run time. Further alternatively, sensors may be used to determine the presence of snow and/or ice buildup on the PV modules and send a control signal to activate the source of warmed air 402. Upon sensing that the snow and/or ice buildup has been cleared the sensors send another control signal to deactivate the source of warmed air 402. Alternatively, the source of warmed air 402 may shut off automatically after a predetermined run time.

Throughout the description and claims of this specification, the words "comprise", "including", "having" and "contain" and variations of the words, for example "comprising" and "comprises" etc., mean "including but not limited to", and are not intended to, and do not exclude other components.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

What is claimed is:

1. A frame for supporting at least one photovoltaic module, comprising:
    a plurality of sidewalls arranged to support the at least one PV module at a spaced distance from an installation surface, the sidewalls defining an interior volume having an open top and an open bottom, wherein a first sidewall of the plurality of sidewalls has a plurality of openings defined therethrough along a portion of a length thereof;
    a plenum disposed adjacent the first sidewall and extending along at least the portion of the length of the first sidewall having the plurality of openings defined therethrough, the plenum having an inlet port for receiving a flow of warmed air from a source of warmed air, and the plenum configured to distribute the flow of warmed air through at least some of the plurality of openings in the first sidewall and into the interior volume and, balancing plugs disposed within some openings of the plurality of openings, wherein the balancing plugs are configured to block the flow of the warmed air through said some openings.

2. The frame of claim 1, comprising at least one PV module detachably secured to the frame and covering the open top of the interior volume.

3. The frame of claim 1, wherein the sidewalls have a recessed upper support surface disposed inwardly of a raised edge and extending around the frame, the at least one PV module being supported on the upper support surface of the sidewalls when detachably secured to the frame, and wherein the raised edge limits movement of the at least one PV module.

4. The frame of claim 1, wherein at least some sidewalls of the frame are formed with an outwardly extending flange section for receiving a mechanical fastener for securing the frame to a roof of a building.

5. The frame of claim 1, wherein the portion of the length of the first sidewall extends between 90% and 95% of the length of the first sidewall.

6. The frame of claim 1, wherein an inter-opening spacing between some adjacent openings is different than an inter-opening spacing between other adjacent openings for selectively directing more warm air into some portions of the interior volume relative to other portions of the interior volume.

7. The frame of claim 1, wherein each sidewall comprises a first rectangular tube that is welded to a second rectangular tube and further comprises a skirt having a first edge that is welded to the second rectangular tube, the skirt also having an outwardly extending flange that is formed along a second edge opposite the first edge.

8. The frame of claim 7, wherein the first rectangular tube, the second rectangular tube and the skirt are made from aluminum or an aluminum alloy.

9. The frame of claim 8, comprising a plurality of attachment points arranged one each at corners of the frame between adjacent ones of the plurality of sidewalls, the attachment points for connecting to lifting cables during installation of the frame on the roof of a building.

10. A kit for supporting at least one PV module on a roof of a building, comprising;
a frame comprising a plurality of sidewalls defining an interior volume that is covered by the at least one PV module when in a supported condition, one of the sidewalls having a plurality of openings defined therethrough, and the frame having a plenum defined adjacent to an exterior surface of the first sidewall and covering the plurality of openings, the plenum having an inlet port for receiving a flow of warmed air;
a heater element; and
a fan for directing into the plenum a flow of air that has been warmed by the heater element, wherein each sidewall comprises a first rectangular tube that is welded to a second rectangular tube and further comprises a skirt having a first edge that is welded to the second rectangular tube, the skirt also having an outwardly extending flange that is formed along a second edge opposite the first edge.

11. The kit of claim 10, comprising a conduit for providing fluid communication between the heater element and an inlet port of the plenum.

12. The kit of claim 10, comprising a plurality of balancing plugs configured to be insertable into the openings of the plurality of openings.

13. The kit of claim 10, comprising a notched washer and a bolt that is sized to extend through the notched washer and into a portion of the frame that is below the at least one PV module when in the supported condition, the notched washer having a notch therein for simultaneously engaging a top surface and a side-edge surface of the PV module being retained thereby.

14. The kit of claim 10, wherein the first rectangular tube, the second rectangular tube and the skirt are made from aluminum or an aluminum alloy.

15. The kit of claim 14, comprising a plurality of attachment points arranged one each at corners of the frame between adjacent ones of the plurality of sidewalls, the attachment points for connecting to lifting cables during installation of the frame on the roof of a building.

16. The kit of claim 10, wherein the sidewalls have a recessed upper support surface disposed inwardly of a raised edge and extending around the frame, the at least one PV module being supported on the upper support surface of the sidewalls when in the supported condition, and wherein the raised edge limits movement of the at least one PV module.

17. A method comprising:
providing at least one photovoltaic module supported by a frame comprising a plurality of sidewalls, a first one of the sidewalls having a plurality of openings defined therethrough, and a plenum is disposed adjacent to the first sidewall and extends around the plurality of openings;
introducing a flow of warmed air into the plenum via an inlet port thereof such that the plenum distributes the flow of warmed air through at least some of the plurality of openings and into a space that is below the at least one PV module and is bounded by the plurality of sidewalls;
after heat transferred to the at least one PV module from the warmed air in the space has caused accumulated snow or ice on the PV module to melt, stopping the flow of warmed air into the plenum and
inserting balancing plugs into some openings of the plurality of openings for blocking the flow of the warmed air through said some openings.

18. The method of claim 17, wherein the at least one PV module is supported by the frame attached to a roof of a building, and wherein introducing the flow of warmed air comprises providing the flow of warmed air via a conduit from a source of warmed air disposed inside the building.

\* \* \* \* \*